F. W. PAWLING.
GLASS SHEAR MACHINE.
APPLICATION FILED JULY 11, 1912.

1,164,311.  Patented Dec. 14, 1915.

Fig. 4.

WITNESSES:
A. H. Edgerton.
O. M. McLaughlin

INVENTOR.
Francis W. Pawling.
BY
V. H. Lockwood
ATTORNEY.

UNITED STATES PATENT OFFICE.

FRANCIS W. PAWLING, OF TERRE HAUTE, INDIANA.

GLASS-SHEAR MACHINE.

1,164,311. Specification of Letters Patent. Patented Dec. 14, 1915.

Application filed July 11, 1912. Serial No. 708,825.

*To all whom it may concern:*

Be it known that I, FRANCIS W. PAWLING, a citizen of the United States, and a resident of Terre Haute, county of Vigo, and State of Indiana, have invented a certain useful Glass-Shear Machine; and I do hereby declare that the following is a full, clear, and exact description thereof, reference being had to the accompanying drawings.

In the manufacture of hollow glass ware, difficulty has been experienced in preventing a line or blister in the finished article resulting from the glass dropped into the mold last and which has been chilled slightly by contact with the shears or by being allowed to string out. This chilled portion of the glass, unless properly reheated by the rest of the glass in the blank mold, will not unite with it, but will cause a line or blister in the finished article, as before mentioned.

The object of this invention, therefore, is to provide suitable means in connection with a glass machine which will cause the proper reheating of the last portion of the glass dropped into the mold and prevent imperfections in the finished article.

The features of the invention lie in the use of a shear control by which that part of the gather last cut off will be directed to the center of the mold together with suitable depressing means, whereby this chilled tip will be pressed beneath the surface of the glass where it will be reheated by the mass of glass within the mold so that it will unite with the rest of the glass.

Figure 1:
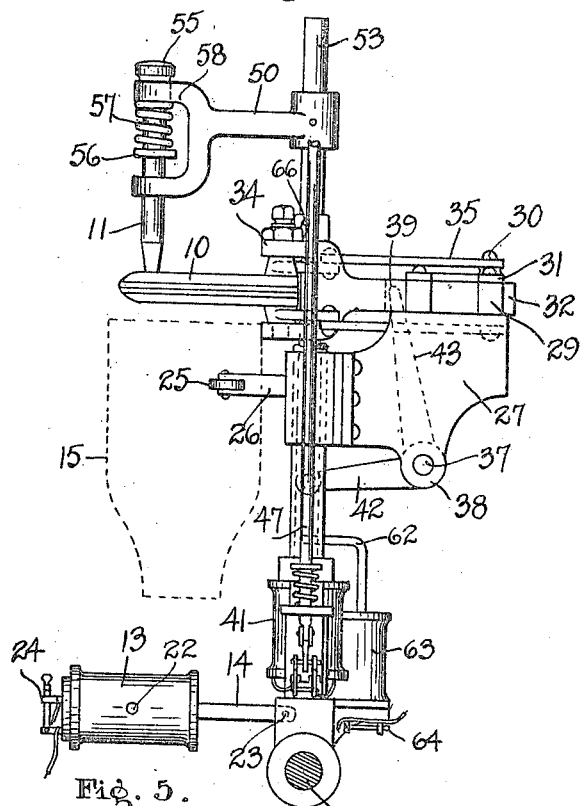
Figure 2:
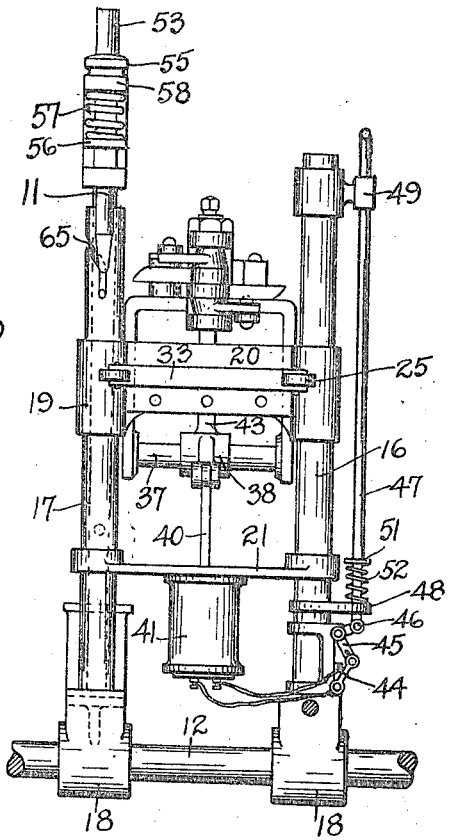
Figure 5:
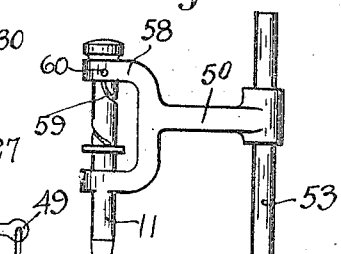
Figure 3:
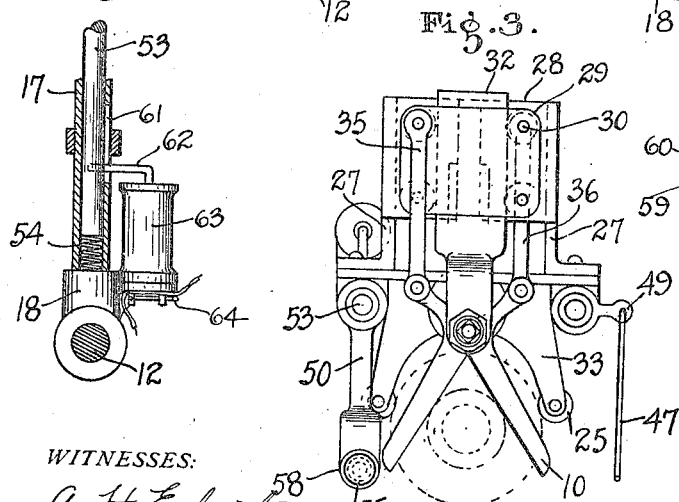

The nature of the invention will be understood from the accompanying drawings and the following description and claims:

In the drawings, Figure 1 is a front elevation of a glass machine embodying my invention, portions being broken away. Fig. 2 is a left-hand elevation of Fig. 1. Fig. 3 is a plan view of Fig. 2. Fig. 4 is a side elevation of the depressing pin shown in Fig. 1, but with the spring removed to show the means for turning said pin. Fig. 5 is a detail partially in section showing the means for lowering the depressing pin.

In detail there is shown in the drawings, a portion of a glass machine having a frame carrying a pair of shears 10 and a depressing pin 11 mounted upon a fixed rod 12 and adapted by means of a solenoid 13 and connecting rod 14 to oscillate said frame into the position shown, in which the shears will lie above the blank mold 15, shown by dotted lines, and the depressing pin will lie above and to one side of said blank mold and said shears.

The frame, before mentioned, consists of a rod 16 and a tubular rod 17 upon the lower ends of which heads 18 are fixed which are free to turn upon the horizontal rod 12 and with a yoke for uniting the upper end of said rods which consists of tubular members 19 connected by a plate 20. There is also a secondary yoke 21 between the main yoke and the rod 12 upon which the shear operating means is mounted. The solenoid 13 is oscillatably mounted upon a pin 22 and the connecting rod 14, forming an extension of the core of said solenoid is pivotally secured at 23 to the right-hand rod head 18, shown in Fig. 2. There is a switch 24 located on said solenoid 13, as shown in Fig. 1, and when closed, current will flow through said solenoid, move its armature toward the left and draw the frame to the position shown in Fig. 1, the left-hand movement of said frame being stopped by rollers 25 upon short arms 26 secured to the yoke heads 19 engaging the press mold 15.

Upon the rear side of each of the yoke heads 19 a plate 27 is secured which extends at right angles from said parts and upon its upper edge, each carries a plate 28 which extend toward each other and which are spaced away from the frame and spaced apart from each other. Upon the upper side of said plates four rollers 29 are mounted upon pins 30 which extend through the plates 28 and a plate 31. The plates 28 and 31, together with the rollers 29, form a guiding means for the rear end 32 of the bar for controlling the movement of the shears 10. The jaws of the shears 10 are substantially L-shaped and are fulcrumed upon a pin 33, which pin extends through the bifurcated forward end 34 of the block 32. The rear end of each of the shear members is pivotally connected to links 35 and 36 whose rear ends are pivoted upon the pair of pins 30. As shown in Fig. 3, the left-hand link 35 lies upon the upper side of the plate 31, while the right-hand link 36 lies beneath the right-hand plate 28 and thus when the jaws of the shears are closed, the left-hand side lies above the right-hand side. As before mentioned, the bar 32 is guided by the rollers 29 and when moved to the right from the position shown in Fig. 1, the forward yoked end 34 engaging the plates 28 and 31, limits the movement thereof. There is a rod 37 extending between the plates 27 upon which a bell crank 38 is mounted, the upper arm 43 of which extends into a slot 39 in the bar 32, see dotted lines in Fig. 1, and the lower arm is pivotally connected to the armature 40 of a solenoid 41 which is secured to the yoke 21. When said solenoid is actuated, the arm 42 of said bell crank will be elevated and the arm 43 will be moved to the right from the position shown in Fig. 1 and to the rear as shown in Fig. 3, and the shears will be closed and when the circuit of said solenoid is broken, the weight of the parts will return them to the positions shown. For the purpose of operating said solenoid, a knife switch 44 is located upon the bar 16 and the free end of said switch is pivotally connected with one end 45 of a bell crank fulcrumed upon the rod 16, and the other end 46 of said bell crank is pivotally secured to a rod 47 which extends upward and parallel with said rod 16, being guided by means of guides 48 and 49 which are secured to the rod 16. The upper end of said rod 47 is bent at a right angle and extends in a horizontal position parallel with an arm 50 supporting the depressing pin 11, hereafter described. There is a collar 51 secured to the rod near the guide 48 and a spring 52 lies between said collar and said guide and normally keeps the bell crank arm 46 elevated and the switch 44 in an open position. The switch 44 controls the flow of current to the solenoid 41.

Within the hollow frame rod 17 a rod 53 is supported by a spring 54 and near the upper end of said rod the arm 50, before mentioned, is secured, the outer end of said arm being bifurcated with the depressing pin extending loosely through the ends thereof. The pin 11 has a head 55 upon its upper end and between the forked ends of the arm 50 a collar 56 is secured and a spring 57 surrounding the rod and bearing against the upper end 58 of said arm 50 and said collar 56, tends to keep the pin in the position shown in Fig. 1. A spiral groove 59 is cut in the pin 11 and a pin 60 in the upper end 58 of the arm 50 extends into said slot for the purpose of turning said pin 11 as hereafter described. Normally the arm 50 lies at right angles to the yoke plate 20. Near the upper end, a groove 65 is cut in the tube 17 and a pin 66 in the rod 53 extends into said groove. The lower part of said groove is vertical but the upper part extends about the tube a short distance and advances toward the left, such that when the rod 53 is depressed, the arm 50 and the depressing pin 11 will be moved toward the right from the position shown in Fig. 2, and when said rod 53 is depressed sufficiently, the pin 11 will enter the blank mold 15. Near the lower end of the rod 17 and upon the rear side of the frame there is a vertical slot 61 through which extends the bent upper end 62 of the armature of a solenoid 63 into operative engagement with the rod 53. There is a knife switch 64 located adjacent said solenoid.

The operation of my invention is as follows: The workman having gathered a suitable quantity of glass on his punty, closes the switch 24 which moves the frame to the upright position shown in Fig. 1, and then after working the glass until it is in suitable condition, he allows it to drop into the blank mold 15 and when a suitable quantity has fallen into said mold, he allows his punty to rest upon the bent downward end of the rod 47 and depress the same. This will close the switch 44 controlling the solenoid 41 and the shears 10 would be operated and the glass sheared off. The operation of the shears is such that the fulcrum pin 33 moving to the rear, the last tip of glass cut off will fall into the blank mold 15. The workman then raises his punty, whereupon the spring 52 will cause the opening of the switch 44 and the shears will move back to their open position due to the weight of the parts. The workman then closes the switch 64 and current passing to the solenoid 63, will pull down on the rod 52 which will depress the arm 50, but in doing so the pin 66 traveling in the spiral groove 65, will turn the arm to the right a sufficient amount that by the time the depressing pin 11 engages the upper surface of the glass within the press mold 15, said pin will have reached the center of the mold and further depression of the rod 53 will cause the pin 11 to press beneath the surface of the glass of the last tip to be cut off and which was slightly chilled. Thus this last tip will be reheated and will unite with the rest of the glass. The downward movement of the pin 11 will be resisted slightly by the glass within the mold and the pin will move upward through the bifurcated ends of the arm 50 and will be twisted a slight amount due to the action of the pin 60 in the spiral groove 59. The switch 64 now being opened, the spring 54 will raise the rod 53 and the pin 11 will be lifted out of the glass, but in doing so it will be turned again under the action of the pin 60 and groove 59 which will tend to release the glass from adhesion with the lower end of the pin and prevent its being drawn upward to form a line or blister. Further upward movement of the rod 53 will cause the arm 50 to move back to the position shown in Fig. 2, after which the switch 24 is opened and the frame will fall toward the right out of the road of the blank mold which then may be cared for in the usual manner.

While in the drawings there is shown a machine having the shear mounted upon an oscillatory frame, yet I do not wish to limit myself to this particular construction, for my shear may be used with equal facility upon glass machines of the rotary type in which the molds are mounted upon a movable table which can be revolved beneath the shears.

I claim as my invention:

1. In a glass machine, the combination with a press mold, of a pin appreciably smaller than the mouth of the mold, and means for inserting the pin into the mouth of the mold after the gather of glass has entered the mold and limiting the entering movement of the pin so that it will merely submerge the chilled upper point of the gather of glass into the body of glass without pressing the glass.

2. In a glass machine, the combination with a press mold, of a pin adapted to enter the mouth of the mold, means for inserting the pin into the mouth of the mold after a gather of glass has entered the mold and limiting the entering movement of the pin so that it will merely submerge the chilled upper point of the gather of glass into the body of glass without pressing the glass, and means for causing the pin to turn as it approaches the gather of glass in the mold.

3. In a glass machine, the combination with a press mold, of a pin adapted to enter the mouth of the mold and having a spiral groove in it, a vertically movable member having bifurcated arms in which said pin is mounted so as to be vertically movable, a pin in one of said arms projecting loosely into the groove of the first-mentioned pin, a spring for yieldingly resisting the upward movement of the pin, and means on said pin for limiting the downward movement of the pin in said mounting, substantially as set forth.

4. In a glass machine, the combination with a mold, a platform mounted upon the frame of the machine, a pair of shear jaws, a link for each jaw pivoted at one end on said platform and with the other end pivotally connected with said shear jaw, means connected with said jaws between said link connections and the cutting edges for opening and closing said shear jaws, means for operating said shear operating means, and means for oscillating said frame whereby said shear will be moved into and away from a position above said mold.

5. In a glass machine, the combination with a mold, of a pivotally mounted frame, a platform mounted thereon, a pair of shear jaws, a link for each jaw pivoted at one end on said platform and with the other end pivotally connected with said shear jaw, means connected with said jaws between said link connections and the cutting edges for opening and closing said shear jaws, a lever fulcrumed on said frame and having one end operably connected to said jaw connection, electrically controlled means in connection with the other end of said lever for operating said shear, and means for oscillating said frame whereby said shear will be moved into and away from a position above said mold.

6. In a glass machine, the combination with a mold, of an oscillatory frame, a shear supported thereby and adapted when said frame is in a vertical position to project over said mold, a rod carried by said frame, an arm on said rod, a rod yieldingly carried by the free end of said arm, said arm being adapted to lie above and to one side of said mold when said frame is elevated, and means in connection with said frame carried rod for turning the same as said rod is depressed whereby said arm carried rod will enter said mold and depress a portion of the glass within said mold beneath the surface thereof.

7. In a glass machine, the combination with a mold, of an oscillatory frame, a shear supported thereby and adapted when said frame is in a vertical position to project over said mold, a rod carried by said frame, an arm secured upon the outer end of said rod, a yieldingly supported rod upon the outer end of said arm and extending parallel with said frame carried rod, said arm being adapted to lie above and to one side of said mold when said frame is elevated, means on said frame in engagement with said frame carried rod whereby said rod will be turned and said arm carried rod will be moved into position above said mold as said frame carried rod is turned and caused with the further depression of said frame carried rod to depress a portion of the glass beneath the surface of the rear of the glass in said mold, and means for turning said rod as it enters and leaves the glass in the mold.

8. In a glass machine, the combination with a mold, of a platform mounted above said mold, a pair of L-shaped shear jaws, a link for each jaw pivoted at one end on said platform and with the other end pivotally connected with said shear jaw, means connected with said jaws between said link connections and the cutting edges for opening and closing said shear jaws, a lever fulcrumed on said frame and having one end operably connected to said jaw connection, and electrically controlled means in connection with the other end of said lever for operating said shear.

9. In a glass machine, the combination with a mold, of a platform mounted above said mold, a pair of L-shaped shear jaws, a link for each jaw pivoted at one end of said platform and with the other end pivotally connected with the outer end of the shear jaws, reciprocatory means connected with said jaws between said link connections and the cutting edges for opening and closing said shear jaws, means for guiding said reciprocatory means, a lever fulcrumed adjacent said platform and having one end operably connected with said reciprocatory means, and electrically controlled means in connection with the other end of said lever operating said shear.

In witness whereof, I have hereunto affixed my signature in the presence of the witnesses herein named.

FRANCIS W. PAWLING.

Witnesses:
J. H. WELLS,
O. M. McLAUGHLIN.